United States Patent [19]

Anderl et al.

[11] 4,348,576

[45] Sep. 7, 1982

[54] POSITION REGULATION OF A CHARGE CARRIER BEAM

[75] Inventors: Peter Anderl, Munich; Clauspeter Mönch, Grafrath, both of Fed. Rep. of Germany

[73] Assignee: Steigerwald Strahltechnik GmbH, Puchheim, Fed. Rep. of Germany

[21] Appl. No.: 110,555

[22] Filed: Jan. 8, 1980

[30] Foreign Application Priority Data

Jan. 12, 1979 [DE] Fed. Rep. of Germany ....... 2901148
Sep. 13, 1979 [DE] Fed. Rep. of Germany ....... 2937094

[51] Int. Cl.³ ............................................. B23K 15/00
[52] U.S. Cl. ..................... 219/121 EW; 219/121 EC; 219/121 EV; 250/397
[58] Field of Search ................... 219/121 EB, 121 EC, 219/121 ED, 121 EM, 121 EU, 121 EV, 121 EW; 250/397

[56] References Cited

U.S. PATENT DOCUMENTS

| | | |
|---|---|---|
| 2,793,281 | 5/1957 | Steigerwald . |
| 3,417,223 | 12/1968 | Steigerwald et al. . |
| 3,534,386 | 10/1970 | Mercer .......... 219/121 ED |
| 3,534,387 | 10/1970 | Sanderson et al. ......... 219/121 EC |
| 3,775,581 | 11/1973 | Sciaky ................ 219/121 EW |

FOREIGN PATENT DOCUMENTS

| | | |
|---|---|---|
| 2141971 | 3/1973 | Fed. Rep. of Germany . |
| 1615507 | 9/1973 | Fed. Rep. of Germany . |
| 2220335 | 9/1973 | Fed. Rep. of Germany . |
| 1515199 | 1/1974 | Fed. Rep. of Germany . |
| 2821028 | 11/1978 | Fed. Rep. of Germany ...... 219/121 EW |
| 110198 | 12/1974 | German Democratic Rep. . |
| 136355 | 7/1979 | German Democratic Rep. .......... 219/121 EC |
| 1179161 | 1/1970 | United Kingdom ........ 219/121 EW |

OTHER PUBLICATIONS

*Automatic Welding,* (G.B.); vol. 25, No. 1, Jan. 1972; pp. 38-40; "A Seam Tracking System for Electron Beam Welding", by F. N. Ryzhkov et al., Voronezh Polytechnic Institute.

*Primary Examiner*—J. V. Truhe
*Assistant Examiner*—Keith E. George
*Attorney, Agent, or Firm*—Braumbaugh, Graves, Donohue & Raymond

[57] ABSTRACT

In a charge carrier beam machine, as an electron beam welding machine, a system for establishing the relative position of a beam impingement spot on a workpiece surface and a machine reference position, as a beam gun axis, comprises an X-ray sensor defining at least one measuring field boundary intersecting the workpiece surface at a line of intersection spaced from the gun axis. During repetitive measuring periods, the beam is deflected from the normal working position along a measuring path, which crosses the line of intersection, and a signal functionally related to the period of time the beam needs to travel from a reference position along the measuring path to the line of intersection is produced. This signal comprises the desired information about the relative position and can be used in a regulating apparatus for maintaining a desired relationship. Two sensors having differently oriented measuring field boundaries can be used to detect any deviations of the workpiece surface from a desired plane and the output signals of these detectors are useful for maintaining a desired positional relationship between a welding site and a filler wire supplied to the welding site. The shape of the cross-section of the beam may be altered during the measuring period to improve the accuracy of the measurement.

13 Claims, 21 Drawing Figures

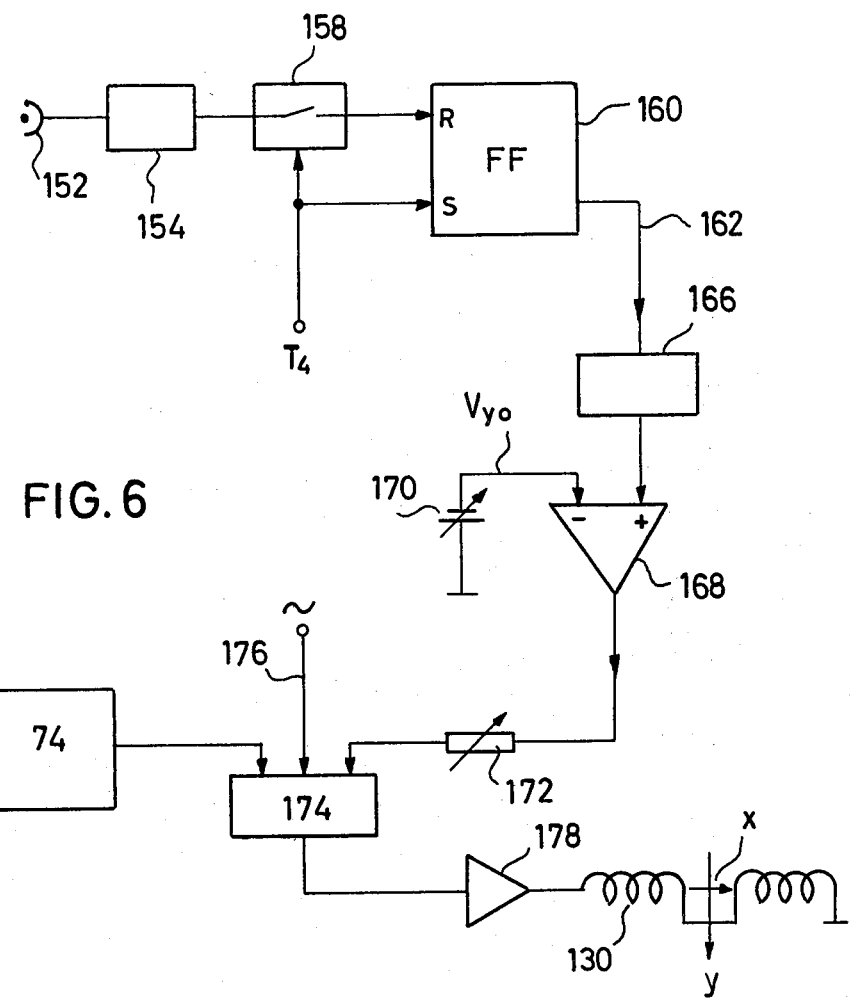
FIG. 6
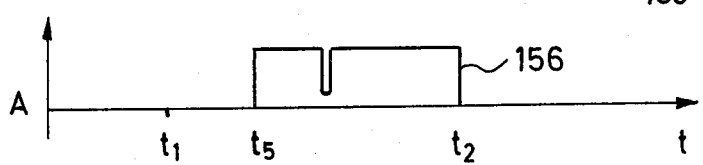
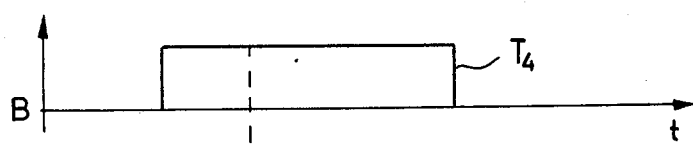
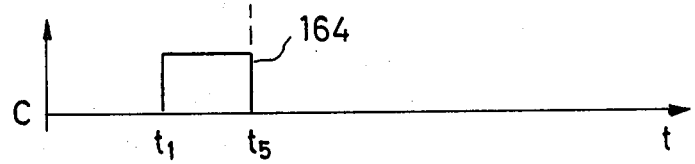
FIG. 7

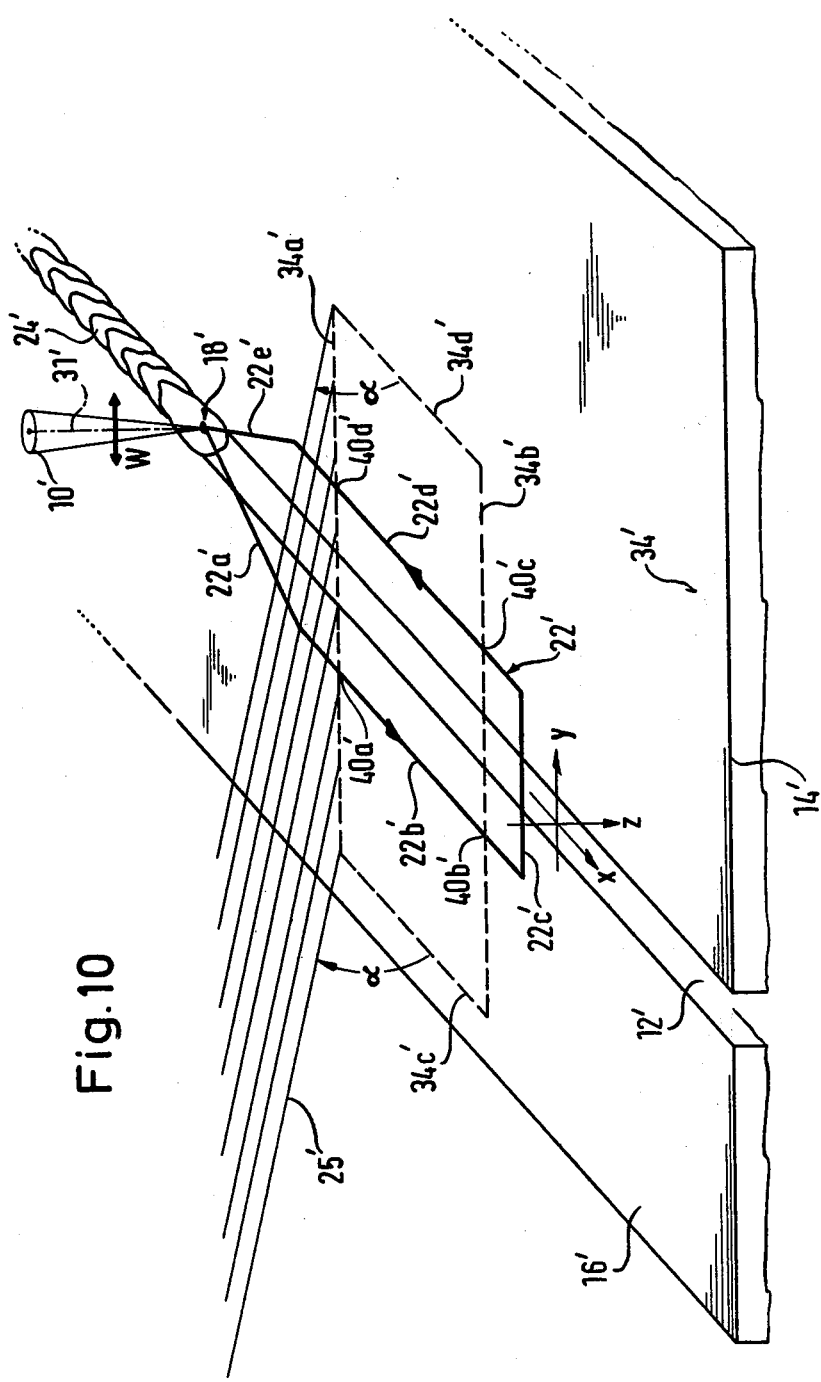

POSITION REGULATION OF A CHARGE CARRIER BEAM

The present invention relates to working a workpiece with a high-energy beam of charged particles, as an electron beam. More specifically, the invention relates to control and maintenance of a predetermined relative position between the impact region of the beam on a workpiece arrangement and a predetermined feature of this workpiece arrangement, as a gap to be welded.

A preferred application of the method and apparatus according to the invention is electron beam welding. The invention is, however, applicable also to other working operations, as electron beam milling, cutting, engraving and also to other types of charge carrier beams, as ion beams.

Electron beam machines (E.B. machine tools) are well-known in the art and described e.g. in U.S. Pat. No. 2,793,281 to Steigerwald. Often, an additional material in the form of a rod, wire or band ("filler wire") is supplied to the welding site, e.g. to make up for the volume of the gap welded and/or to alter the composition of the seam formed by the welding. In such case, it may be desirable to maintain a predetermined distance between the region of the workpiece, where the beam impinges, and the location, where the filler wire arrives at the surface of the workpiece, so that a predetermined relative position and orientation is maintained between the beam and the filler wire, and an undesirable affect of the flow conditions in the molten material formed by the beam, and the filler wire is avoided. Similar conditions prevail, when the distance in the direction of relative movement between the beam and the workpiece arrangement (x direction) from the beam to another device is to be maintained constant, e.g. a melt retaining shoe which travels with the beam along the workpiece. It is further often desirable, to maintain a fixed position relationship between the beam gun of the machine, and subsequent positions of the workpiece arrangement along a working region, e.g. a gap to be welded, especially if a precise relative motion between the beam and the workpiece is to be effected by a pre-established program.

The filler wire is generally supplied into the welding region with an oblique orientation with respect to a mean axis of the electron beam. The distance in welding or x-direction between the point of the impingement of the electron beam and the position of the filler wire in the plane of the workpiece surface may be altered by spurious magnetic fields having a component in a direction (y direction) which is normal to the direction of the propagation of the beam (z direction) and the welding direction (x direction). Similar changes may be caused by variation in the working distance, i.e. variations of the distance between the beam gun and the surface of the workpiece in the z direction.

German patent application disclosure document DE-OS 28 21 028 discloses a method of determining the position of an electron beam in x direction near the surface of the workpiece relative to the beam gun by means of needle-shaped probe electrode which is rotated and periodically travels through the beam. The position of the surface of the workpiece in the z direction is sensed by mechanical probes bearing on the workpiece surface at either side of the gap. However, mechanical probes are often damaged by the severe environment conditions at the welding site. The above known system comprises further means, to scan a portion of the gap in advance of the welding site by the electron beam which is deflected to describe a triangular path, to measure the position and/or the width of the gap. The triangular path comprises a corner coinciding with the welding site, and a side opposite to said corner which crosses the gap. The measurement is effected while the beam travels along said side.

German published patent application DE-AS 16 15 507 discloses a method of determining the position of the impact point of an electron beam on a workpiece to be welded, wherein the surface of the workpiece is scanned in advance to the welding site by the beam which crosses the gap and is operated with reduced power during the scanning period.

It is an object of the present invention to provide methods and apparatuses of the above mentioned general type which provide improved and additional information about the positional relationships and provide signals which can be used for accurately compensating position errors caused by spurious magnetic fields and/or variations in the working distance.

A further object of the invention is to measure any positional errors between a beam of charged particles near a workpiece surface and a device, as a feeder wire nozzle, in a direction of relative movement between a beam gun axis and the workpiece (x-direction).

The invention provides for a method of producing signals accurately indicating the relative position between the spot, where a charge carrier beam, as an electron beam, of a charge carrier beam machine tool impinges on a workpiece arrangement, with respect to a reference position which has a fixed position with respect to the beam gun. The beam produces a working region where it impinges on the workpiece. The reference position may be related to the position of a filler wire where it arrives at the workpiece, or of a melt retaining shoe or other means moved together with the beam gun relative to workpiece arrangement. The spot, where the beam impinges on the workpiece, is moved along the workpiece in a predetermined working direction (x direction), e.g. to form a weld seam. During short measuring periods, the beam is deflected from the operating region along a path which has the form of a closed, preferably non-crossing curve, as the form of a triangle. During the measuring period the beam is deflected from the momentary working site in the direction of relative movement and in lateral direction off the zone to be treated, as a gap, then across the gap and eventually back to the point of origin at the operating site. The measuring period is short and may last for e.g. several milliseconds. Radiation, preferably X-radiation, which is produced by the interaction of the beam and the workpiece during the measuring period, is detected to produce at least one measuring signal which may be used for regulating the position of the beam and/or for controlling a process parameter depending on the width of the zone to be treated, as the feeding rate of the filler wire. According to the invention, the position of at least one portion of the measuring path is determined in respect to a measuring region border crossed by the measuring path and having a predetermined fixed position with the respect to the beam gun. A signal is produced when the beam crosses said border, and this signal can be used for controlling the mean position of the beam and/or—in combination with a regulation of the beam with respect to the gap—the position of the gun.

Errors of the position of the beam in the direction of relative movement between the mean beam axis and the workpiece can be precisely determined and compensated by the invention. Specifically, the distance between the region of impingement of the beam and the location of a filler wire in the plane of the workpiece surface can be maintained at a desired value so that sound weld seams can be produced despite an uneven workpiece surface and the existance of spurious magnetic fields which tend to deflect the beam from the desired position.

The invention may also be used for determining any difference of the height of two opposed edges of workpiece parts forming a gap to be welded. A signal indicating such height difference in the mean beam direction (z direction) is produced and may be used for compensation.

Further features and advantages of the invention will become apparent when reading the following description of specific embodiments thereof.

SHORT DESCRIPTION OF THE DRAWINGS

Figure 3:
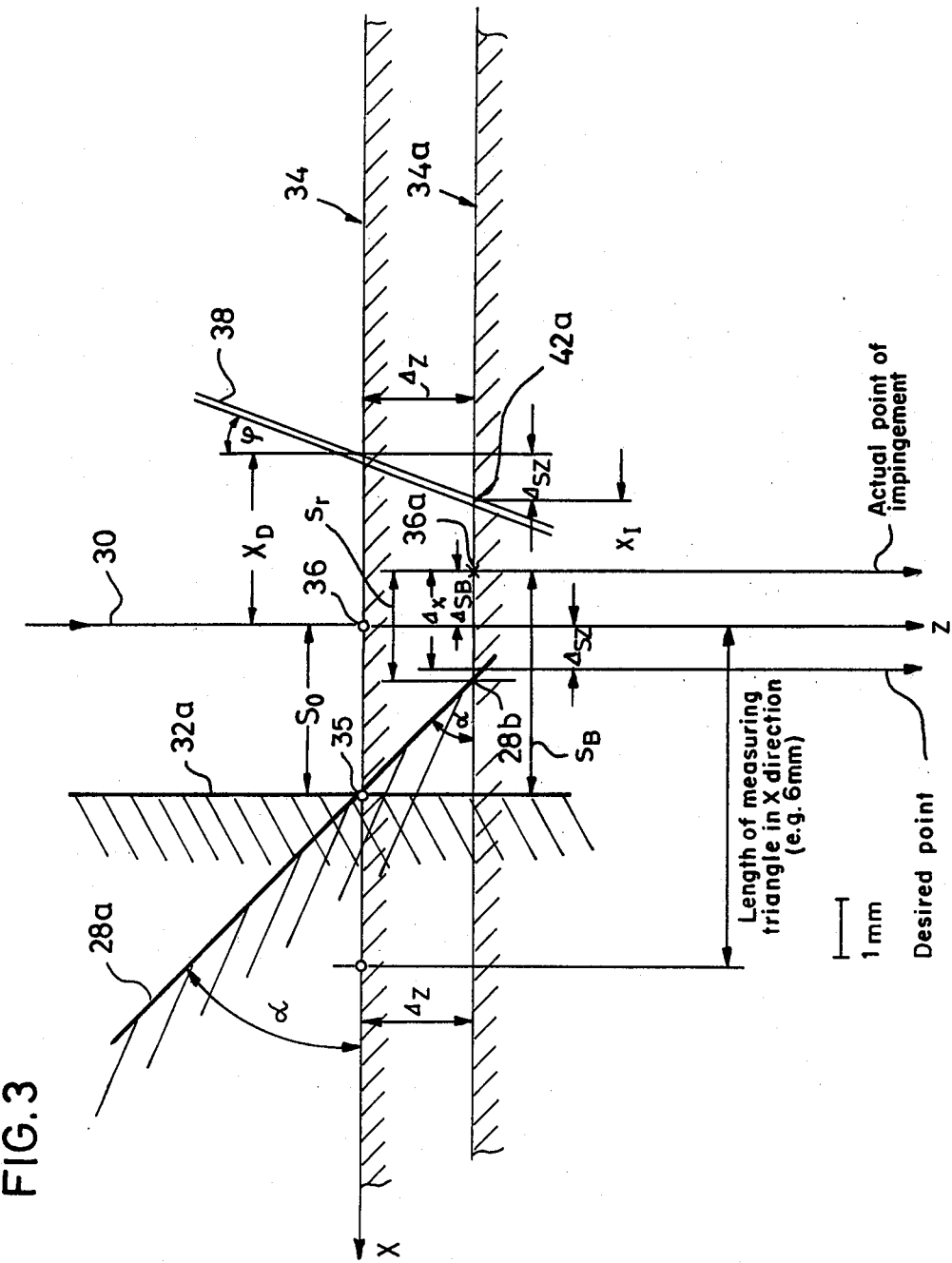
Figure 4:
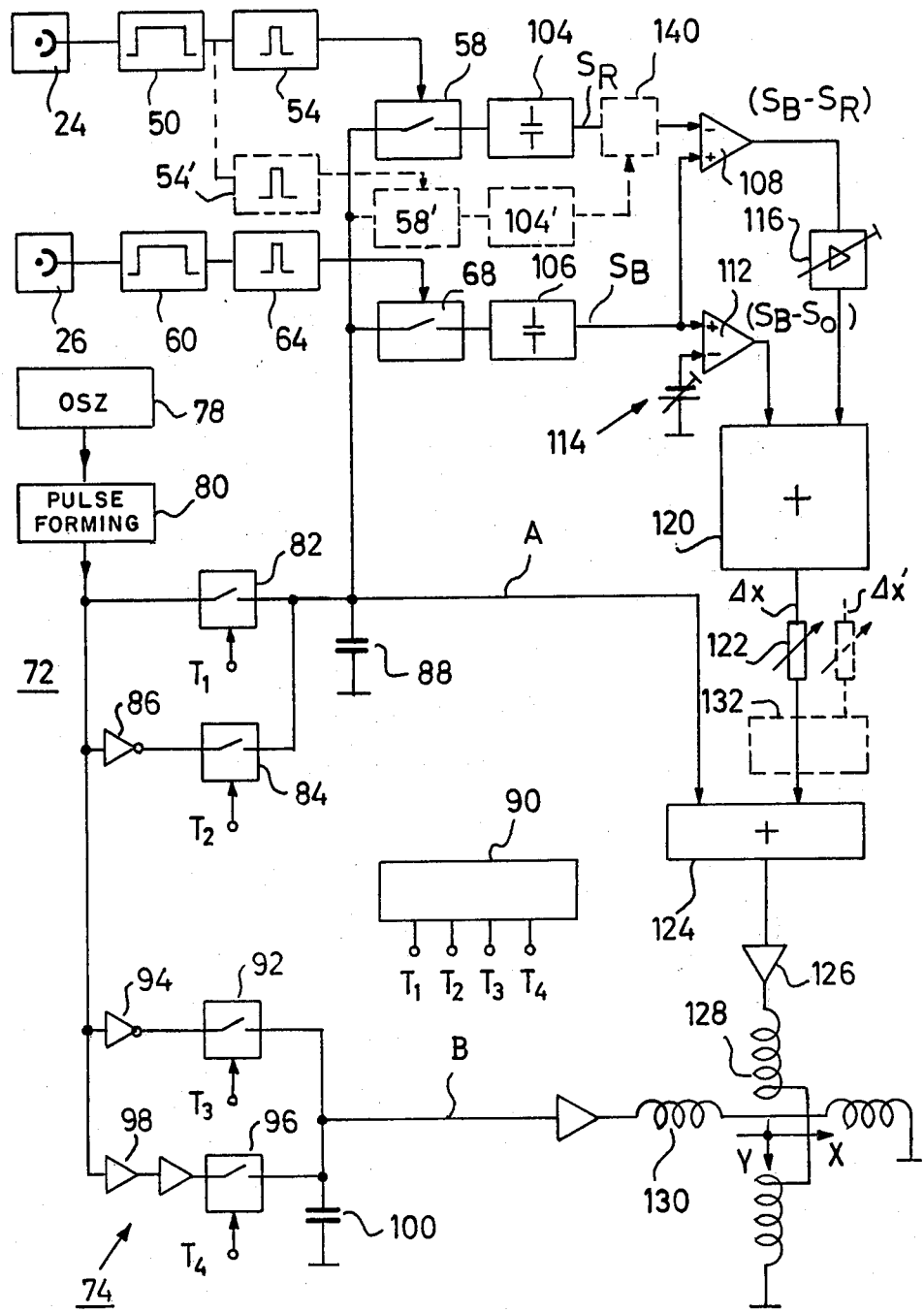
Figure 5:
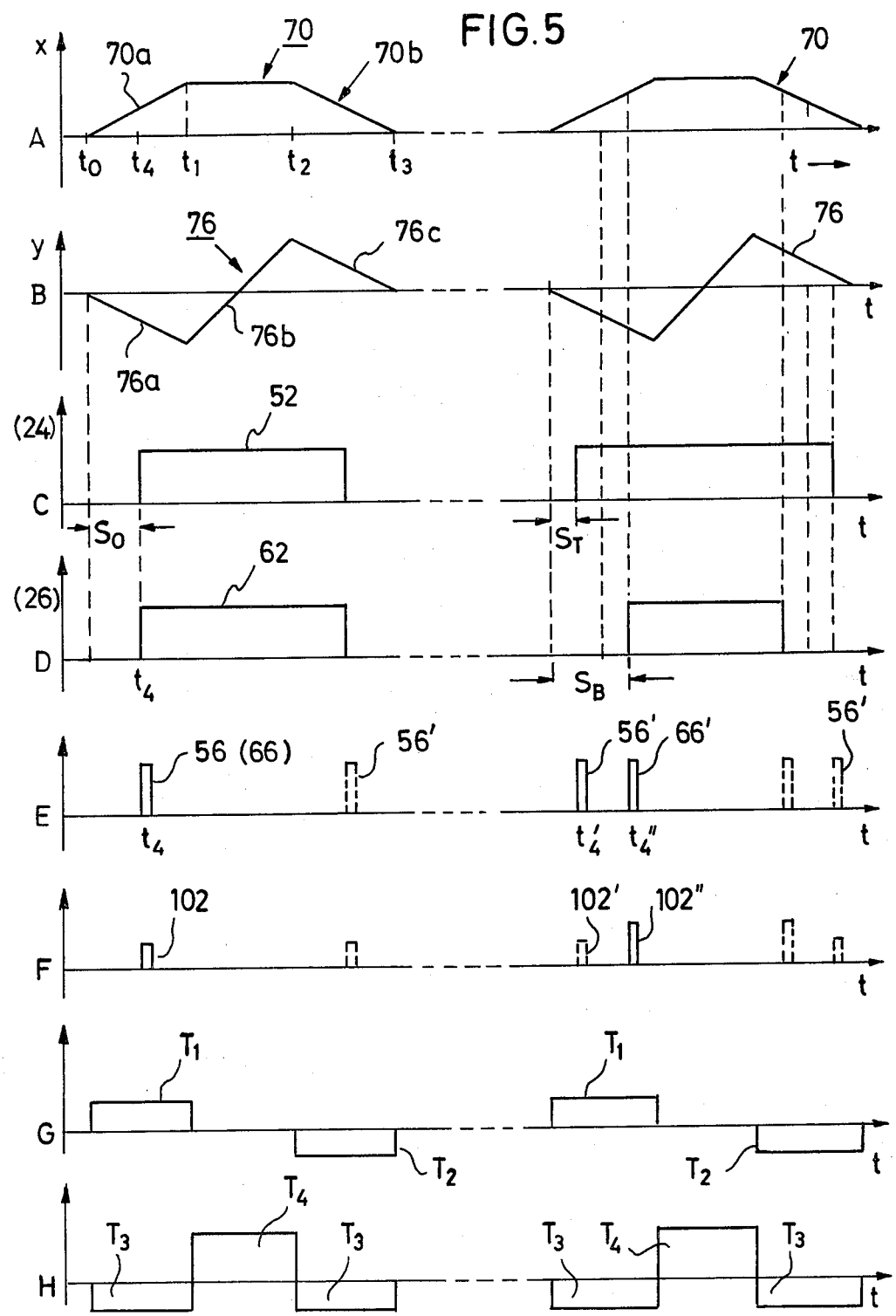
Figure 8:
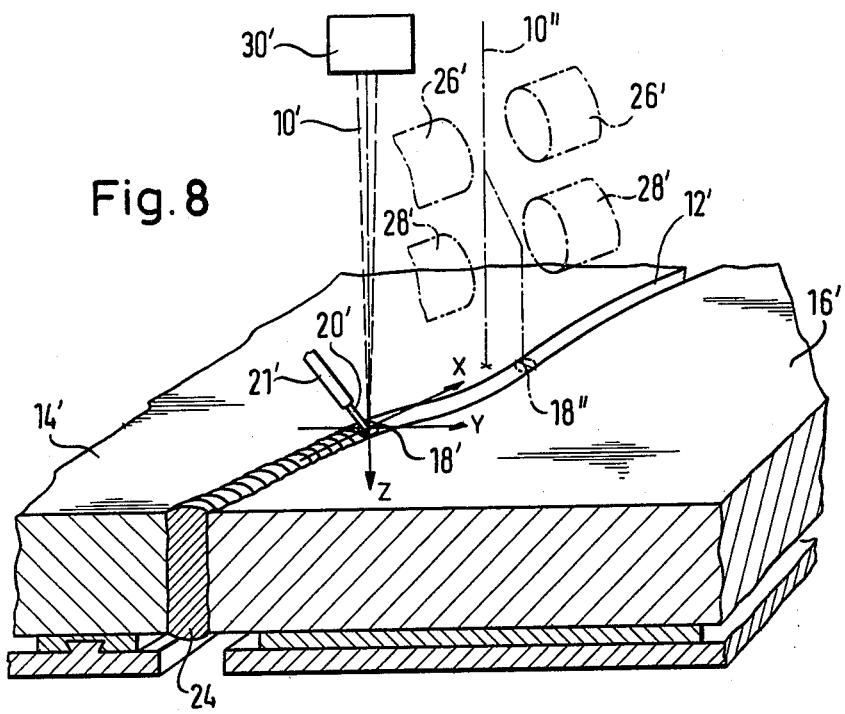
Figure 9:
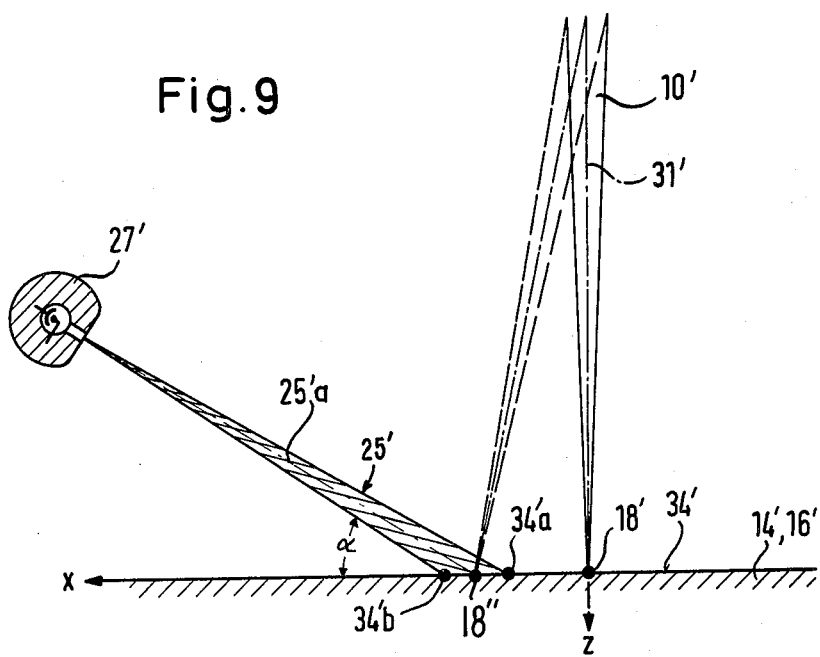
Figure 11A:
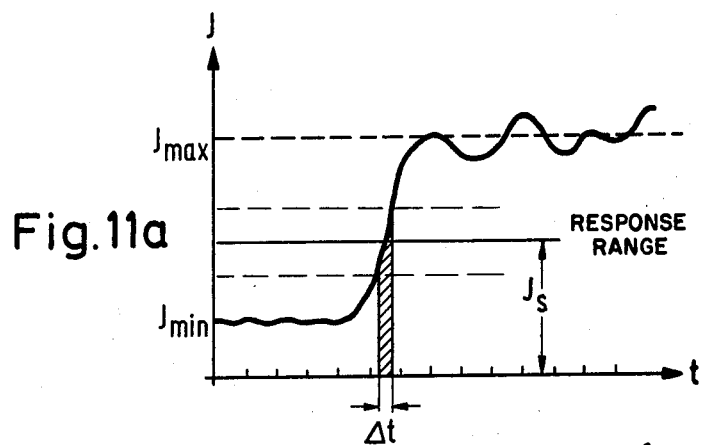
Figure 11B:
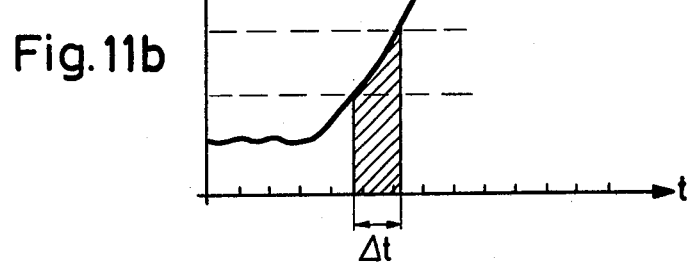
Figure 12:
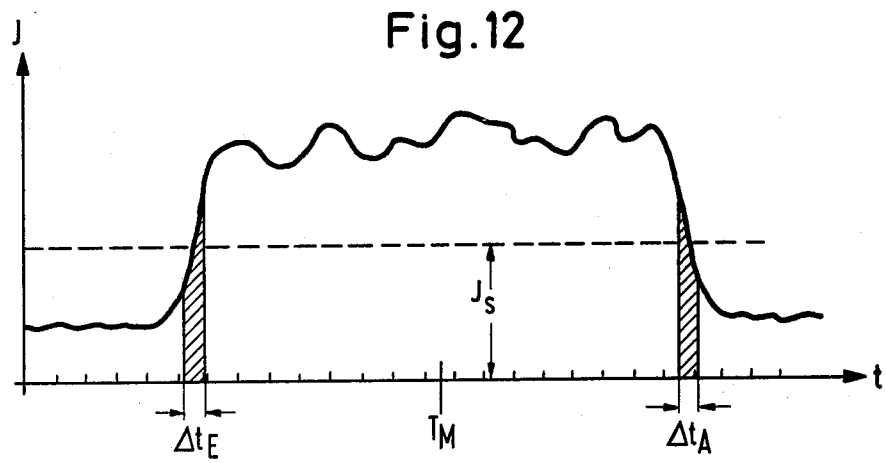
Figure 13A:
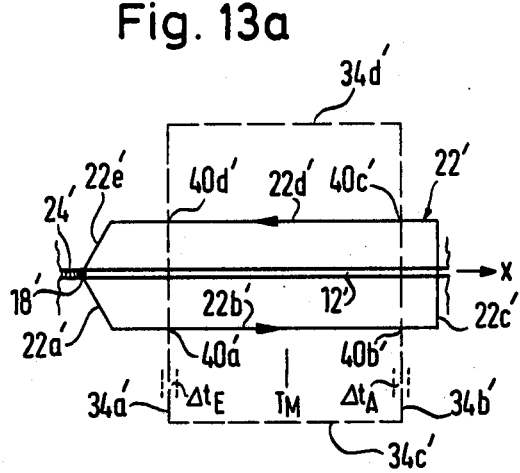
Figure 13B:
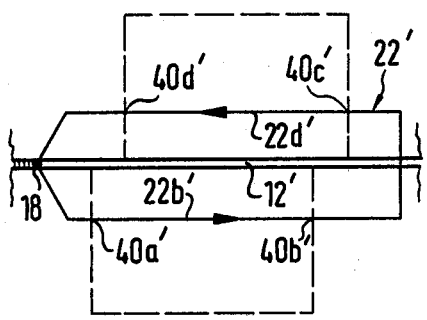
Figure 13C:
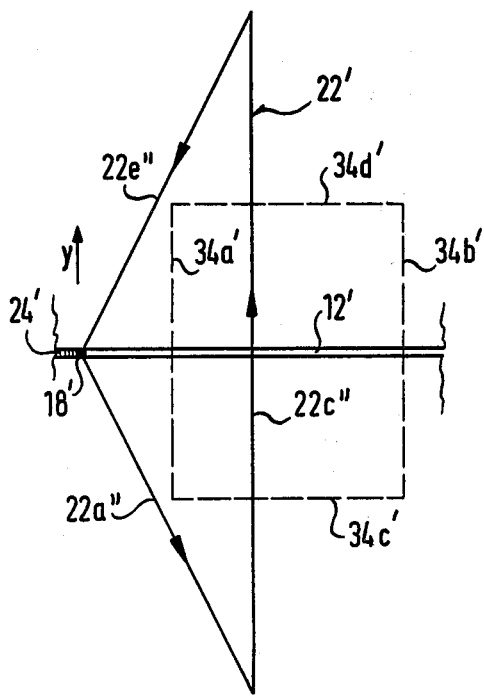
Figure 14:
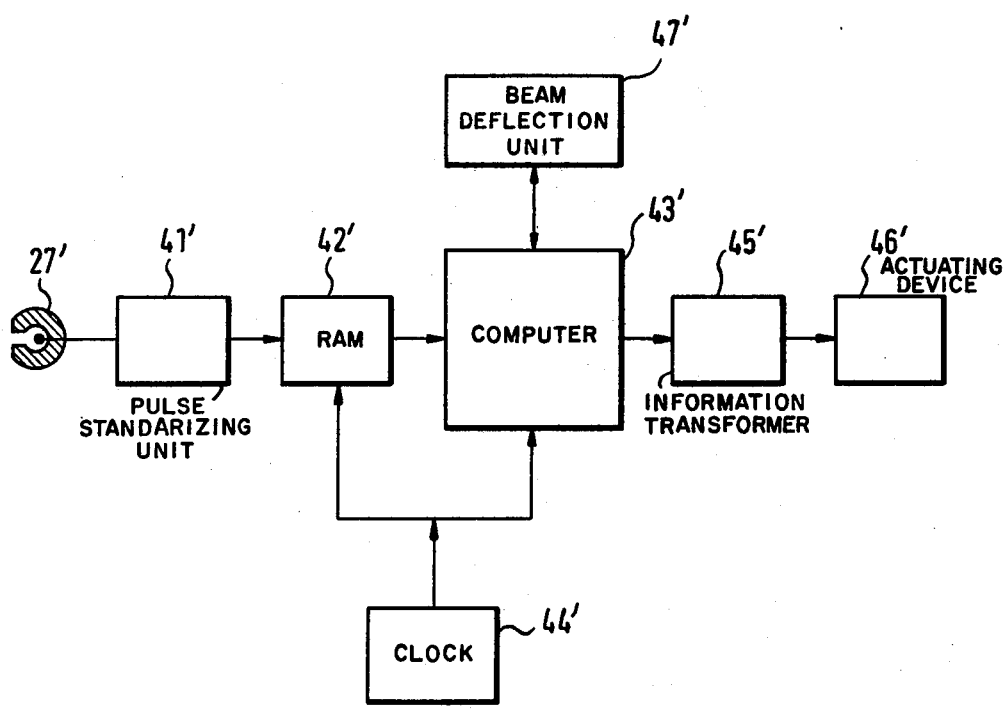
Figure 15:
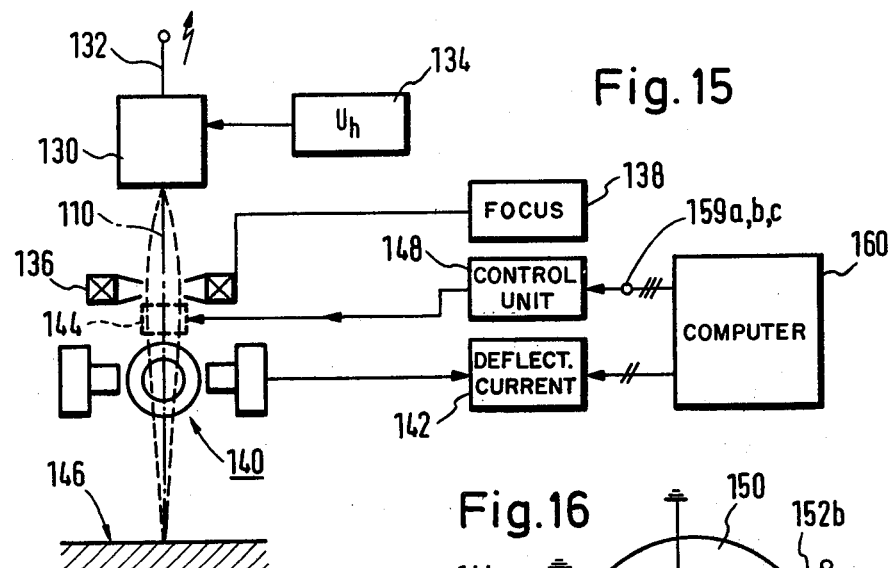
Figure 17:
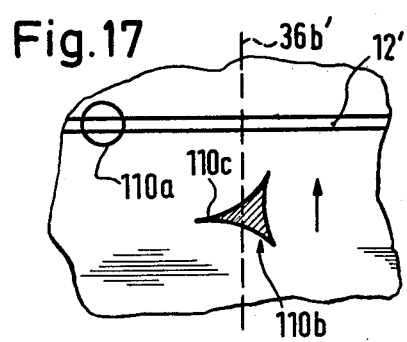
Figure 16:
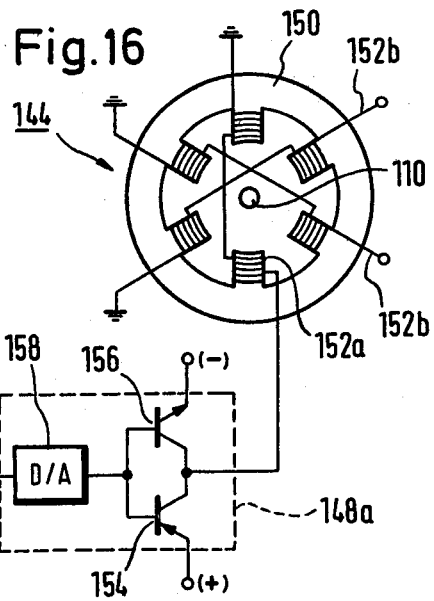
Figure 18:
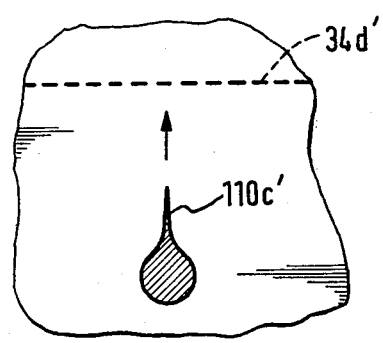
Figure 19:
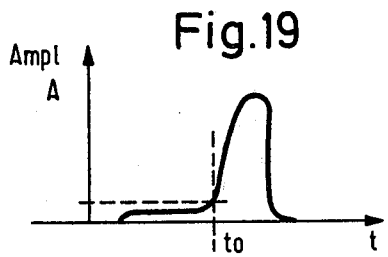

FIG. 3 a schematic view of the situation in the xz-plane with a variation of the working distance and with a variation of the beam position caused by a spurious magnetic field having a component in the y-direction (which is normal to the plane of the drawing);

FIG. 4 is a circuit diagram in block form of an embodiment of a beam position regulating apparatus according to the invention;

FIG. 5 shows waveforms to which reference is made when explaining the operation of the apparatus according to FIG. 4;

FIG. 6 is a circuit diagram in block form of an improvement of the circuit shown in FIG. 4;

FIG. 7 comprises diagrams of waveforms to which reference is made when explaining the operation of the apparatus according to FIG. 6;

FIG. 8 shows schematically how two plates are welded together with an electron beam;

FIG. 9 is an elevation in section showing the principle of a preferred embodiment of the method according to the invention;

FIG. 10 is a perspective view of two plates being welded together with an electron beam, for further explanation of an embodiment of the preferred method;

FIGS. 11a and 11b are diagrams of the waveforms of signals produced when the electron beam crosses the border of a measuring region;

FIG. 12 is a diagram showing the time function of the pulse rate of a sensor output signal showing the situation when the beam enters and leaves the measuring region;

FIGS. 13a to 13c are schematic plane views of different measuring paths used to explain how the position signals are derived;

FIG. 14 is a circuit diagram in block form of a preferred digital regulating system according to the invention;

FIG. 15 is a schematic view, partially in block form, of an electron beam welding machine comprising astigmatism control means in accordance with a further aspect of the present invention;

FIG. 16 is a circuit diagram of a preferred embodiment of the astigmatism control means;

FIG. 17 is a plane view of the workpiece surface and an example of the shape of the beam impingement spot which may be produced with the machine shown in FIG. 15;

FIG. 18 is a view similar to FIG. 17 and shows another example of a beam impingement spot having a shape different to said shown in FIG. 17;

FIG. 19 is a diagram of the amplitude-time-function of a signal produced by a beam having a cross section as shown in FIG. 18.

Figure 1:
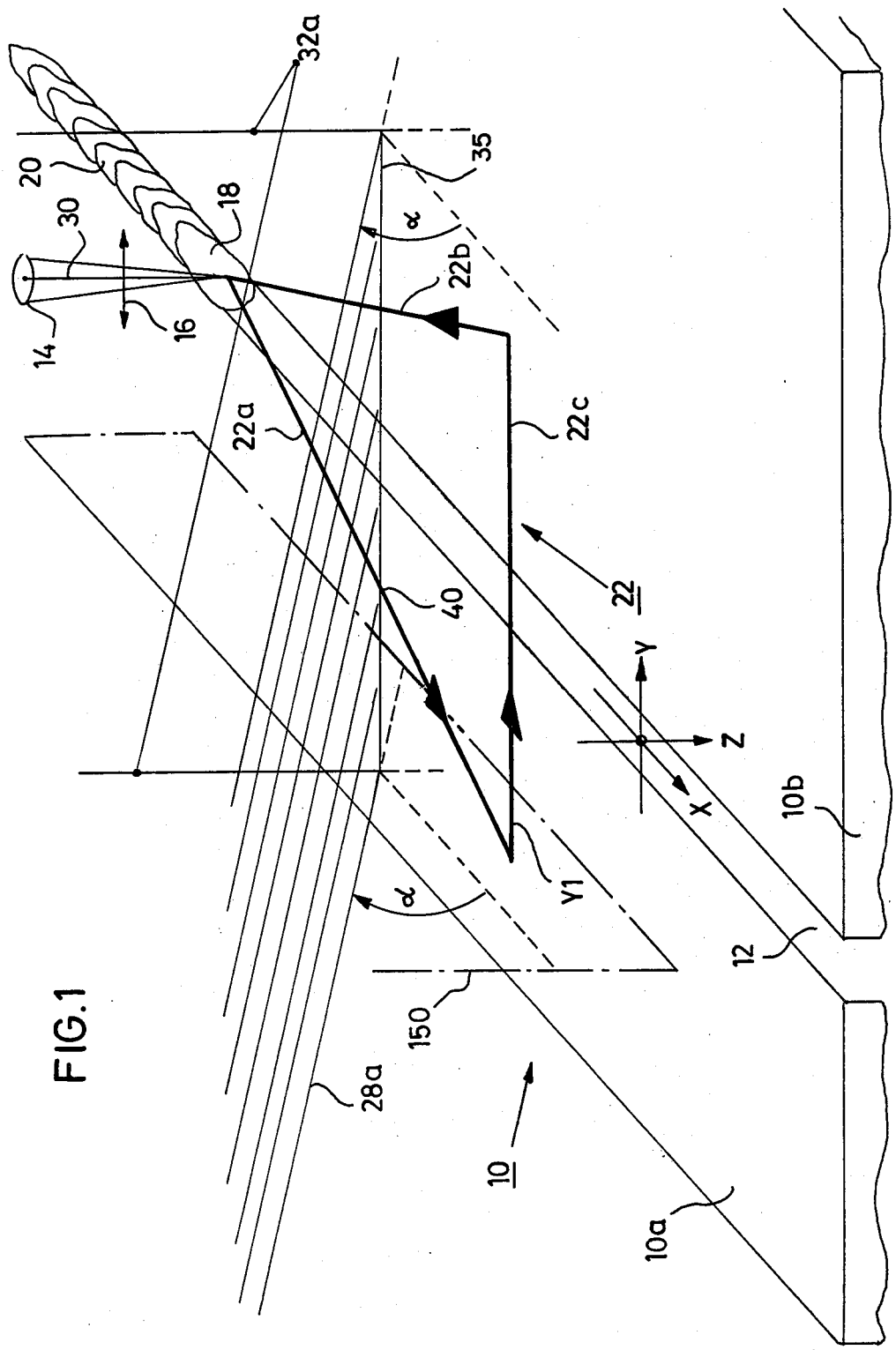
FIG. 1 is a schematic, perspective view of the surface of a workpiece arrangement, a measuring path followed by the beam during a measuring period, and the fields of view of a pair of measuring radiation sensors used in the method according to the invention.

Referring now to the drawings, FIG. 1 shows a workpiece arrangement 10 comprising two workpiece parts 10a and 10b forming two opposed edges which define a gap 12 at which the workpiece parts are to be welded together with a beam of charge carriers, as an electron beam 14 produced by an electron gun (not shown) of a conventional electron beam (EB) welding machine which may be constructed as described in the above mentioned United States patent. During welding, the electron beam 14 is periodically deflected or oscillated across the gap 12 as schematically shown by a double arrow 16. Further a relative motion of the electron beam with respect to the workpiece arrangement is produced, e.g. by a movable support (not shown) so that the beam proceeds along the gap 12. The mean beam axis 30 (i.e. axis of the undeflected beam without oscillation) is directed generally to the center of the gap 12 and moves relative to the workpiece arrangement in a welding or x direction. The direction of oscillating 16 is denoted y direction. The beam forms a pool 18 of molten material where it impinges on the work piece arrangement, said pool travelling with the beam along the gap and forming after solidification a weld seam 20. The mean beam axis 30 coincides generally with the axis of the beam gun.

When a measurement step is to be performed, the transverse oscillation 16 of the beam is interrupted for a short period of time i.e. the measuring period, which may last a few milliseconds, and the beam is deflected along a triangular path, which in the following will be termed "measuring triangle" 22. The measuring triangle has two essentially equal sides 22a and 22b which extend in an oblique direction from the welding site at the pool 18 off the welding direction x, and a base side 22c, which extends transverse to the x direction and crosses the gap 12. The oblique sides 22a and 22b meet at a corner through which the mean beam axis 30 extends. The known methods use only the base side 22c for measuring purposes to determine the width of the gap 12 and/or the position of the gap in the y direction.

The method of the invention utilizes also at least one of the other sides 22a, 22b which in the following will called "lateral sides" of the measuring triangle. Two sensors may be provided for the purpose of measurement. The sensors may be X-ray sensors having means, such as collimator systems, for limiting and defining the field of view or measuring field. By this means, further information about the configurational relationships in the vicinity of the welding region is derived and/or the beam position is regulated relative to a machine reference position such as the gun axis. The embodiment, which will now be described, uses two X-ray sensors 24 and 26 which respond to X-ray radiation produced by the electron beam impinging on the workpiece parts 10a and 10b which are made of metal, e.g. steel, titanium, aluminium or other metals or alloys. The power of the electron beam, which may be in the order of tens of kilowatts during the working, as welding, may be reduced during the measuring period when the beam travels along the measuring triangle 22, e.g. to a power in the order of 10 watts, e.g. by increasing the negative voltage at a Wehnelt or control electrode of the electron gun as known in the art. Preferably, however, the beam is operated with the same high power during the working and the measuring periods.

Figure 2:
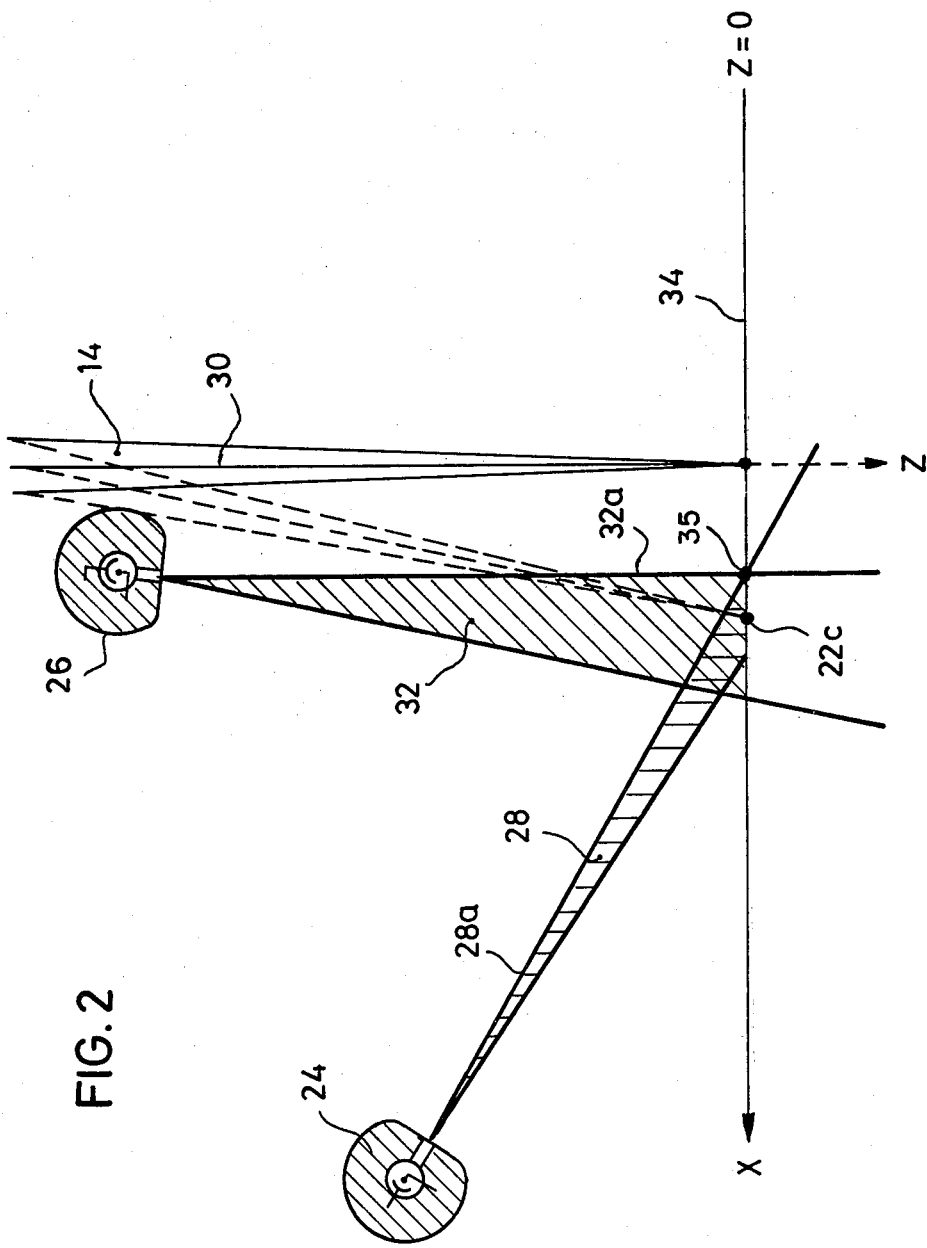
FIG. 2 shows the situation of FIG. 1 in elevation in a section plane in a xz-plane defined by a welding direction (direction of relative movement between the beam and the workpiece) and a mean beam axis.

FIG. 2 shows that the first sensor 24 has a field of view 28 which extends obliquely to the mean direction 30 of the electron beam 16 in the xz plane shown in FIG. 2. The field of view defines a measuring field having an upper boundary 28a extending in parallel to the y direction which is normal to the plane of the drawing of FIG. 2. The sensor 24 may be an X-ray sensor as disclosed in FIGS. 4 and 8 of U.S. application Ser. No. 904,648 incoporated by reference. The second sensor 26 which may be also an X-ray sensor, is positioned and oriented such that its field of view 32 has a rear boundary 32a facing the beam 14 and extending parallel to the mean beam direction 30 (z-direction) and parallel to the y direction. The boundary plane 32a intersects the "rear" measuring field boundary 28a of the first sensor 24 in a straight line 35 comprised in the plane 34 which is normal to the z direction and intersects the z-axis in a point z=0 corresponding to the desired working distance. Thus, the sensor 24 may be positioned in the xz-plane, and the second sensor 26 may be positioned in a plane which, seen in the welding or x-direction is positioned with a predetermined distance in advance to the YZ plane comprising the mean beam axis 30, said distance being smaller than the extension of the measuring triangle 22 in the x direction.

The measuring triangle 22, which is scanned by the beam 14 in, say two milliseconds with a repetition frequency of a few Hertz, may be dimensioned and produced in a known manner. The base side 22c which is essentially parallel to the y direction, may be used, as known, for determining the position of the beam in the y direction with respect to the gap and/or for measuring the width of the gap.

FIG. 3 shows the geometrical situation near the welding site in an enlarged scale. The plane of the drawing corresponds to the XZ plane. FIG. 3 shows the plane 34 which comprises the line of intersection 35 of the rear measuring field boundaries 28a and 32a. The plane 34 constitutes also the desired position of the workpiece surface (z=0). The workpiece surface at the start end of the weld seam or gap 12 is generally adjusted into this plane in preparation to the welding process. In no spurious magnetic fields are present, the mean beam direction 30 intersects the plane in a desired point of impingement 36. The mean beam direction 30 advances in the x-direction during the welding. A filler wire 38 is supplied in the XZ-plane with an angle $\phi$ such that it meets the plane 34 and enters in the pool of molten material (not shown in FIG. 3) a desired distance $x_D$ behind the mean beam direction 30 of the undeflected beam.

During each measuring period, the beam traces a measuring triangle as shown in FIG. 1. The deflection of the beam along the lateral side 22a comprises both a longitudinal component in the x direction and a transverse component in the y direction. Thus, the point of impingement of the beam arrives eventually at a point 40 (FIG. 1) on the line of intersection 35 and enters there into the field of view of both sensors 24 and 26, so that the output signal of these sensors increases accordingly.

It is now assumed, that the working distance increases by $\Delta z$ because of an unevenness of the workpiece surface, and that further a spurious magnetic field, e.g. caused by a remanent magnetism of the workpiece, exists which displaces the beam by a distance $\Delta_{SB}$ in the negative x direction, i.e. in the direction towards the filler wire 38. The plane, in which the surface of the workpiece is now situated, has the reference number 34a in FIG. 3, and the mean direction of the electron beam in the vicinity of the workpiece (i.e. the direction of the electron beam deflected by the spurious magnetic field, without the intentional transverse oscillation) intersects the plane 34a in a point 36a. Thus, point 36a is now the actual point of impingement of the beam. The distance between the place, where the filler wire 38 arrives at the plane 34a, and the actual point of impingement 36a is therefore reduced to $x_f$. To reestablish the desired distance $X_D$ between the point 42a, where the filler wire 38 intersects the plane 34a, and the actual point of impingement 36a of the beam, a correcting beam deflection $\Delta x$ in the x-direction is necessary. The correcting movement $\Delta x$ is the sum of a correcting movement $\Delta_{SB}$, compensating for the beam deflection caused by the spurious magnetic field, and the correcting movement $\Delta_{SZ}=\Delta z \cdot \tan \phi$ for compensating the effect of the variation of the working distance.

Thus, the following shift or deflection $\Delta x$ of the point of impingement of the beam is necessary to reestablish the desired distance $x_D$ between the point of impingement of the beam and the point, where the filler wire arrives at the plane of the workpiece surface:

$$\Delta x = \Delta_{SB} + \Delta_{SZ} = \Delta_{SB} + \Delta z \cdot \tan y \quad (1)$$

The following further relationship can be derived from FIG. 3:

$$\Delta z = (S_B - S_R) \cdot \tan \alpha \quad (2)$$

wherein $S_R$ is the distance in the x-direction between the actual point of impingement 36a of the beam and a line of intersection 28b between the plane 34a and the boundary plane 28a of the measuring field of the sensor 24. $S_B$ is the distance in x-direction between the impingement-point 36a and a line of intersection between the boundary plane 32a of the measuring field of sensor 26, and plane 34a, and $\alpha$ is the angle between the plane 34 or 34a and the boundary plane 28a. Further, the following relationship can be derived from FIG. 3:

$$\Delta_{SB} = S_B - S_O \quad (3)$$

The following equation can be derived by substituting the terms of equations (2) and (3) into equation (1):

$$\Delta x = (S_B - S_O) + (S_B - S_R) \cdot \tan \alpha \cdot \tan \phi \quad (4)$$

Equation (4) comprises the constant apparatus parameters $S_O$, $\tan \alpha$ and $\tan \phi$, and the values of $S_B$ and $S_R$ which can be measured. The value of $S_B$ is directly measured by means of sensor 2, the value of $S_R$ can be measured with sensor 1, these values correspond to the respective x-component of the beam deflection during a lateral side of the measuring triangle, i.e. the distance in x-direction between the starting point 36a of the triangular deflection path and the point, where the point of impingement of the beam crosses the measuring field boundaries 32a and 28a of the second and first sensor 32, 24 respectively.

Reference is now made to FIGS. 4 and 5 which show an apparatus for compensating any undesirable deviation of the actual point of impingement in the x-direction measured as described above.

The output signal of the first sensor 24 is applied to a pulse forming circuit 50 (e.g. a Schmitt-trigger circuit) which produces a rectangular pulse 52 (FIG. 5C) in response to a rising edge of the output signal of the sensor 24, said pulse having a steep rising and falling edge. The rising and falling edges of the rectangular pulse 52 occur, when the beam impingement spot tracing the measuring triangle enters the measuring field of the sensor 24 at the boundary 28a and later leaves the measuring field.

The output of the pulse forming circuit 50 is coupled to an input of a pulse generator circuit 54 which may be a monostable multivibrator and is triggered by the rising edge of the rectangular pulse 52. Upon being triggered, the pulse generator circuit 54 produces a rectangular pulse 56 (FIG. 5E) of predetermined duration which is applied to a first input of a transmission gate 58 which may comprise a logical AND circuit.

The output of the second sensor 26 is coupled to a second pulse forming circuit 60 producing a rectangular output pulse 62 having steep rising and falling edges. This pulse is coupled to the input of a pulse generator circuit 64 producing a short rectangular pulse 66 which is applied to a first input of a second transmission gate 68. The function of the components 60, 64 and 68 is similar to said of components 50, 54 and 58, respectively.

A trapezoidal x-deflection signal 70 produced by a x-deflection circuit 72 is applied to a second input of each of the transmission gates 58 and 68. The x-deflection signal 70 is also used for the x-direction of the beam during the measuring periods during which a measuring triangle 23 is traced. An y-deflection circuit 74 is provided for the y-deflection of the beam during each measuring period, said deflection circuit 74 producing a saw-tooth signal 76 as shown in FIG. 5B.

The x-deflection circuit 72 may comprise an oscillator 78, the output signal of which is applied to a pulse forming circuit 80 delivering a series of constant area rectangular pulses. These rectangular pulses are applied directly to the input of a gate 82 and through an inverter 86 to the input of a second gate 84. The outputs of the gate 82 and 84 are coupled together and with an integrating capacitor 88. The gate 82 is made conductive by a gate pulse $T_1$ (FIG. 5G) during the rising portion of the trapezoidal x-deflection signal during each measuring period, so that it can pass the pulses from the pulse forming circuit 80 to the integrating capacitor 88 where they are integrated to produce the rising portion 70a. The frequency of the output signal of the oscillator 78 is high enough to secure a sufficiently smooth rising portion 70a which, exactly speaking, is a step function.

The gate 84 is made conductive by a gate pulse $T_2$, which, because of the inverter 86 has a polarity opposite to that of the pulses from the gate 82, thus, the charge across the capacitor 88 is gradually reduced to zero, thus producing the sloping portion 70b.

The gate pulses $T_1$ and $T_2$ are produced by a timer 90 known in the art.

The y-deflection circuit 74 is of similar construction. It comprises a gate circuit 92, to which pulses are applied from the pulse forming circuit 80 through an inverter 92, and a second gate circuit 96, to which pulses are applied from the pulse forming circuit 80 through a non-inverting amplifier 98, the gain of which being twice the gain of the inverter 94. The output terminals of the gate circuit 92 and 96 are coupled together and with an integrating capacitor 100. The gate circuit 92 is enabled by gate pulses $T_3$ from the timer 90 during the portion 76a and 76c of the sawtooth signal 76 sloping in the negative direction, while the gate circuit 76 is enabled by a gate pulse $T_4$ from the timer 90 during the rising portion 76b of the sawtooth. Since the pulses, which are passed by the gate circuit 96, have twice the amplitude of the pulses passed by the gate circuit 92 because of the difference of gains of the inverter 94 and the amplifier 98, the rising portion 76b is steeper than the sloping portion 76a and 76c.

The polarity and amplitude of the control or gate pulses $T_1$ to $T_4$ shown in FIGS. 5G and 5H is intended to symbolize the polarity and amplitude of the pulses which are passed by the respective gate circuit 82, 84, 92 and 96 during the application of the respective pulses.

The x-deflection signal which is produced across the integrating capacitor 88, is applied to the signal inputs of the gate circuits 58 and 68. Thus, the pulses from the pulse generator circuits 54 and 64, respectively, which are applied to the control or gate inputs of the gate circuits 58 and 68 sample from the portion 70a of the trapezoidal x-deflection signal 70 a pulse (e.g. pulse 102 in FIG. 5F) having an amplitude equal to the amplitude of the trapezoidal x-deflection signal 70 in the moment of the appearance of the leading edge of the pulses 52 and 62, respectively.

The outputs of the gate circuits 58 and 68 are applied to hold circuits 104 and 106, respectively to hold the sampled signal amplitude until the next sampling during the next measuring period. Thus, a signal corresponding to $S_R$ is available at the output of the hold circuit 104, while a signal corresponding to $S_B$ is available at the output of the hold circuit 106. If the point of impingement of the beam has the desired position, both $S_R$ and $S_B$ are equal to $S_O$.

The differences which are needed for implementation of equation (4) are produced by a pair of subtracting circuits formed by differential amplifiers 108 and 112, respectively. The differential amplifier 108 has a pair of input terminals to which the outputs of the hold circuits 104 and 106, respectively, are applied. One of the two inputs of differential amplifier 112 is coupled to the output of the hold circuit 106, while a bias corresponding to $S_O$ is applied to the other input, said bias being produced by a bias source 114 which is preferably adjustable.

The output of the differential amplifier 108 is applied to an amplifier 116 having and adjustable gain, so that (tan $\alpha$. tan $\phi$) can be set. The output of the amplifier 116 is coupled to a first input of a summing circuit 120. The second input of the summing circuit is coupled to the output of the differential amplifier 112. Thus, a signal proportional to $\Delta x$ is available at the output of the summing circuit 120. This signal is applied, preferably through an amplitude adjusting device 122, e.g. a potentiometer or an amplifier of adjustable gain, to a further summing circuit 124 for combination with the x-deflection signal from the integrating capacitor 188. The combined x-deflection signal is applied to x-deflection coils 128 of the electron beam welding machine, which is not shown in detail, through a power amplifier 126.

If the spot impinges at the desired position, both $S_R$ and $S_B$ are equal to $S_O$, and the output signals of the differential amplifiers 108 and 112 are therefore also zero. The conditions with the desired position of the point of impingement of the beam are shown in the left portion of FIG. 5. The right hand side of FIG. 5 shows a condition, as explained with reference to the lower portion of FIG. 3. The pulses 56 and 66 do appear no more in the middle of the rising portion 70a of the trapezoidal x-deflection signal (t4), but at points of time $t'_4$ and $t''_4$, respectively, as shown by pulses 56' and 66', respectively. Thus, the output pulses 102' and 102'' of the gate circuits 58 and 68, respectively, have an amplitude differing from the amplitude corresponding to the desired value (pulse 102 corresponding $S_O$) so that a correcting signal is produced which compensates the deviation $\Delta x$. For the rest, the operation of the system should become apparent from the above description in combination with FIGS. 4 and 5.

The one lateral side 22a of the measuring triangle was used for measuring purposes in the above described embodiments and, thus, a positional error of the workpiece part 10a only can be detected. However, if desired, also the other lateral side 22b of the measuring triangle can be utilized for measuring purposes to measure also the position of the surface of the workpiece part 10b. This can be simply effected by additional pulse generator circuits corresponding to the pulse generator circuits 54 and 64 and responding to the trailing edge of the pulses 52 and 62, respectively. These pulse generator circuits produce gate pulses to control further gate circuits which correspond to gate circuits 58 and 68, respectively and produce output signals which are processed to a further signal $\Delta x'$ in quite the same way as above described with reference to the signal $\Delta x$.

The signals $\Delta x$ and $\Delta x'$ may be combined in a circuit 132 to form a mean value and this mean value may be applied as correcting signal to the summing circuit 124. An addition or alternative use of the signal $\Delta x'$ may be to form a signal corresponding to the absolute magnitude of the difference $\Delta x - \Delta x'$ and to produce an alarm signal, when this difference exceeds a predetermined limit. For this purpose, two differential amplifiers (for positive and negative differential values, respectively) each followed by a threshold circuit and an OR gate combining the outputs of the threshold circuit to form an alarm signal, may be used.

Further, a correcting signal $\Delta \bar{x}$, corresponding to the mean height level of the surfaces of working parts 10a und 10b may be produced by implementing the following equation:

$$\Delta \bar{x} = (S_B - S_O) + \tan\alpha \cdot \tan\phi \cdot \left(S_B - \frac{S_R^a + S_R^b}{2}\right) \quad (5)$$

A circuit for implementing equation (5) is shown in FIG. 4 and includes the components shown in dashed lines: A additional pulse generator circuit 54' is connected to the output of the pulse forming circuit 50. Pulse generator circuit 54' response to the rear edge of the output pulses 52 of the pulse generator circuit 50 to produce output pulses 56' (FIG. 5E) which are used to control an additional gate circuit 58' having a signal input coupled to the integrating capacitor 88 and a signal output coupled to a hold circuit 104'. The output of the hold circuit 104' and the output signal of the hold circuit 104 are applied to a mean value forming circuit 140, which combines the output signals of the hold circuits 104 and 104' and produces an output signal of an amplitude which corresponds to half the sum of the input signals (and, thus the last term in equation 5) and is applied to the subtracting input of the differential amplifier 108.

The above explained principle may also be used to sense undesired deviations in y-direction of the mean beam axis at the surface of the workpiece caused by spurious magnetic fields having a component in x-direction. For this purpose, a further sensing field boundary 150 (FIG. 1) is used, which may be defined by an individual sensor 152 (as an X-ray sensor) but is preferably defined by a sharp lateral measuring field boundary (34d' in FIG. 13a and 13c) of a single sensor 27' as will be explained below with reference to FIG. 9 to 14.

A circuit arrangement as shown in FIG. 6 may be added to the circuit shown in FIG. 4 to accomodate the further sensor 152. The output of the sensor 152 is applied to a pulse forming circuit 154 (which corresponds to pulse forming circuits 50 or 60) and produces an output signal 156 (FIG. 7A) with steep edges. The output of the pulse forming circuit 154 is coupled to the signal input of a gate circuit 158, the output of which being coupled to a reset terminal R of a flipflop 160. The pulse-shaped control signal T4 (FIG. 5H) is applied to a control input of the gate circuit 158, so that the gate circuit 158 is enabled to pass the signal from its input to its output terminal when the beam travels along the base side 22c of the measuring triangle 22 (FIG. 1).

The control signal T4 is also applied to a set input S of the flip-flop 160 which is set by the rising edge of the control signal T4 and produces, when set, an output signal 164 (FIG. 7C) on a line 162. The flipflop is reset by the leading edge of the formed output signal 156 of the sensor 152 at a varying point of time $t_5$ so that the duration of the output signal 164 of the flipflop corresponds to the time which the beam needs from the beginning of the base side 22c to the field of view boundary 150 during the measuring period. This distance is denoted with $y_1$ in FIG. 1.

The output signal 164 of the flipflop 160 is applied to an integrating circuit 166 for integration and transformation in an unidirectional voltage of corresponding magnitude, which in turn is applied to a first input of a subtracting circuit formed by a differential amplifier 168. The second input of the subtracting circuit is a voltage $V_{yo}$ from a variable bias source 170. The bias voltage $V_{yo}$ corresponds to the desired value of $y_1$, thus, to the value of the distance between the beginning of the base side 22c and the field of view boundary 150 if no spurious magnetic field is present. Thus, the output of the differential amplifier 168 provides an error voltage, the magnitude and direction of which corresponds to the amount and direction of the deviation of the beam impingement point in y-direction caused by a spurious magnetic field. This error voltage is applied to a summing circuit 174 through amplitude adjusting means 172 to combine the error voltage with the y-deflection voltage 76 (FIG. 5b) or a oscillating voltage which oscillates the beam in the usual way in y-direction between the measuring period. The oscillating voltage may be a sinusoidal voltage of, say, several hundred to several thousand Hertz and is applied via a line 176. The output of the summing circuit is coupled to y deflection coils 130 through a suitable power amplifier 178.

Various changes and modifications to the above explained embodiments will occur to those skilled in the art. The hight of the measuring triangle in x-direction may be in practice e.g. chosen to be about 6 mm and the base side 22c may have a length of 6 mm. A measuring period, i.e. the time between $t_o$ and $t_3$ (FIG. 5A) may be a few milliseconds, e.g. 2 milliseconds and the repetition frequency of the measuring periods may be between about 1 Hertz to several hundred Hertz.

It is preferred to use the same beam voltage and beam current, thus, the same beam power, during the measuring period and during the working, e.g. welding of the workpiece. The velocity, with which the beam is deflected relative to the workpiece during the measuring period, is, however, high enough to avoid any damage to the workpiece surface.

A X-ray radiation sensor generally comprises some kind of counter tube or a scintillation crystal in combination with a photo multiplier. Sensors of this type provide an output signal consisting of short pulses, the rate (number per unit of time) depends on the intensity of the X-ray radiation. It has been found that the accuracy which with the point of time can be defined, at which the beam crosses a sensor measuring field boundary depends on a number of parameters, i.e. the beam current and the beam focus (thus the beam diameter at the workpiece surface). These sectors affect the rise time of the pulse rate and, thus, the point of time at which a rate threshold is exceeded, which threshold defining the crossing of the measuring field boundary. The steepness of the rising and falling of the pulse rate of the sensor output signal decrease with increasing beam impact spot diameter and decreasing beam current. The accuracy is also affected by statistical fluctuations of the pulse rate. Since the time, at which the signal rises above or falls below the threshold value determines the magnitude of the measuring signal and, thus, the position correcting signal, the accuracy of the correcting action depends essentially on the accuracy of the determination of the point of time in question.

A preferred embodiment of the invention, which is now described with reference to FIGS. 8 to 15 allows a more exact determination of the point of time from which the correcting signal is derived so that a more exact correction of any positional errors is secured. A further advantage of this embodiment is that only a single sensor is needed.

According to this aspect of the invention, a radiation sensor, preferably a X-ray sensor is used, which has a pair of boundaries which are parallel to each other and to the direction of relative movement between the beam and workpiece arrangement. By this means, two measuring points can be obtained which are spaced in time from each other by a well defined period of time corresponding to the extension of the field of view of the sensor in the direction of the measuring path. The same conditions prevail at these points with respect to the shape of the signal so that by forming a mean value of two response times of a threshold circuit at entrance and exit of the beam into and out of the field of view of the sensor effects are compensated which otherwise would deteriorate the accuracy of the determination of the point of time at which the signal arrives at the threshold value. A measuring field having pairs of parallel boundaries is easily implemented with a single sensor and allows to derive various control and regulating signals for various correction purposes. If e.g. the position of the beam impingement spot relative to the feeding position of a filler wire in the direction of the relative movement between the beam and the weld piece arrangement is to be regulated so that the distance, at which the filler wire enters the pool of molten metal behind the beam is maintained constant to secure a sound weld seam, the measuring path can be chosen such that it crosses each of a pair of boundaries which are parallel to each other and normal to the direction of relative movement during both a trace and retrace section which are parallel to the direction of relative movement. Thus, two measuring points are obtained for each of said sections, namely when the beam enters and leaves the field of view of the sensor, respectively. While each point of time, at which the beam crosses a boundary of the field of view will comprise some error, as explained above, the mean value of the two points of time constitutes a much more exact time definition since some compensation of the errors occurs.

It is generally desirable that the edges of two workpiece parts to be welded together are positioned in one plane which is normal to the gun or machine axis. However, in practice, two plates having uneven thicknesses may have to be welded together and in such case the surface of the one plate may be nearer to the gun than the surface of the other plate. If the mean axis of the field of view of the sensor is oblique to the workpiece surfaces, then the two portions of the measuring field on the surfaces of the two adjacent plates on opposite sides of the gap to be welded are offset in the beam or z-direction so that the measuring field boundaries crossing the gap are offset parallel to each other. This causes a corresponding time difference of the points of time at which the beam impingement spot crosses the measuring field boundaries during the trace and the retrace of the measuring path, and a different mean value of the time of entrance and exit is obtained for the trace and the retrace portions, said two different values relating to the two offset surfaces. These two different mean values may be used as a basis for compromise, and according to a specific aspect of the invention, a mean value is formed on the basis of all of the four points of the time and to derive the regulating signal from such mean value.

Since the relative position and orientation of the beam gun, the filler wire feeding device (and, thus, the orientation of the filler (wire), and the sensor and its field of view, and, thus, the projection of this field of view onto the workpiece surface are known, it is easy to maintain a predetermined position between the measuring region formed by the projection of the field of view of the sensor, and the point, where the filler wire enters the pool of molten materials. Since the measuring path is traced by the point of impingement of the beam which may deviate from the gun or machine axis because of outer influences, the position of the measuring value in respect to the boundaries of the measuring field also depends of such outer effects, thus, information about such deviations between the mean beam axis at the surface of the workpiece during the working operation, and the beam or gun axis may be derived from the time at which the beam crosses the measuring field boundaries during the measuring period. Thus the points of time, at which the beam crosses the measuring field boundaries comprise information about any deviations between the mean working position of the beam and the machine or gun axis and, thus, in turn deviations of the working site relative to machine parts and positions, which have a fixed position and orientation with respect to the machine axis, as the point, where the filler wire enters the gap or welding site. Thus, a position error $\Delta x$ between the mean position of the impingement spot of the beam at the working site and the point, where the filler wire enters the working site, counted in the direction of relative movement between the beam axis and the workpiece (x direction) can be determined and, thus, compensated.

Further, deviations of the mean position of the point of impingement of the beam at the working site from the gun axis in the direction (y direction) normal to the direction of relative movement between the workpiece and the gun axis can be established exactly with the preferred method according to the invention which will be described in more detail below. More specifically, the beam is caused to scan a measuring path which comprises at least one section which crosses a pair of measuring field boundaries which are parallel to the x-direction or working direction (gap direction). The points of time at which these boundaries are crossed by the beam spot are established with respect to a reference time, and a mean value is preferably formed of these point of times. This mean value will coincide with the y position of the gun axis if and only if the mean position of the beam comprises no error $\Delta y$ in the y direction. If, however, the beam is deflected from the desired y position by a spurious magnetic field, this will be reflected in the crossing times of the measuring field boundaries (which are of course symmetrical to the y=0 position).

It is known from the above-identified publications, to establish the relative position between the beam impingement point and the gap to be welded and to use the information thus obtained to regulate the beam position by magnetic deflection so that the beam is maintained centered with respect to the gap. The preferred embodiment of the present invention is very well suited to be used in combination with this known method. Thus, if both the gap to be welded deviates (mechanically) from the initally set y position on the gun axis, and the beam is shifted by a spurious magnetic field in the y direction, and if the position of the beam impingement point is measured relative to the center of the gap by the known method, which, thus, establishes the total deviation (mechanical+magnetical), the method according to the invention can be used to establish the y deviation component solely due to the magnetically caused misalignment between the gun axis and the gap, an both of these misalignments can, thus, be compensated. The mechanical misalignment in y direction between the gun axis and the gap can be obtained by forming the difference between the signal indicating the position with respect to the gap and the signal derived by the present invention which reflects the relative position between the impingement point and the gun axis. The mechanical error can be compensated by a mechanical displacement of the gun relative to the workpiece; this mechanical adjustment also secures the proper position of the filler wire feeder with respect to the welding site. The y deviation component caused by the magnetic field is compensated by a corresponding opposite deflection of the beam by the usual y beam deflection system. Thus, after these two corrections have been effected, the filler wire feeding nozzle is aligned in y direction on the gap and further also the mean position of the beam impingement spot in y direction is aligned to both of the gap and the filler wire. The establishing of the y deviation of the beam impingement spot with respect to the gun axis is effected in the same way as explained above for the deviation in the x direction by forming the mean value of the points of time at which the beam spot crosses the measuring field boundaries which are parallel to the gap or x-direction and symmetrically positioned on both sides of the gun axis. It is, of course, also possible to use unsymmetrically positioned parallel boundaries, in such case, the values of the points of time must be adjusted for the differing distances of the boundaries from the gun axis as can be seen from simple geometrical considerations.

The above outlined aspect of the invention will now be explained in more detail. A typical electron beam working operation is electron beam welding. FIG. 8 shows a typical situation where two metal plates 14' and 16' are welded together by means of an electron beam 10' which is produced by a beam gun 30'. The electron beam welding machine including the beam gun 30' may be a commercially available EB welding machine as e.g. sold by Steigerwald Strahltechnik GmbH, Puchheim/-Germany. The gun 30' is positioned such that the beam 10' is directed into a gap 12' between the plates 14' and 16' to produce an impingement spot 18' where the material melts. Additional material, as a filler wire 20' is fed into the pool of molten material to make up the volume of the gap. The filler wire 20' is delivered from a feeding nozzle 21' of a conventional wire feeding device such that it enters the pool in the working or x-direction behind the beam. The spot of impingement 18 may be oscillated in transverse or y-direction, this conventional oscillation will be disregarded in the following description for the sake of simplicity. A relative movement between the beam 10' and the workpiece arrangement 14'-16' is effected so that the pool of molten material travels along the gap 12' leaving behind a weld seam 24'.

The gap 12' between the plates 14' and 16' is not always exactly straight, therefore measures must be taken that the impingement spot 18' follows the course of the gap. This can be effected by means of magnetic fields as known in the art. A typical situation is shown in dot-dashed lines. Without deflection, the beam 10" would impinge off the gap on the surface of workpiece part 14'. Two pair of deflection coils 26' and 28' produce magnetic fields of such strength that the beam is laterally offset by a proper amount such that the impingement point 18" is centered with respect to the gap 12'. A correction of this type may be necessary even if the gap 12' is straight and undistorted, if the beam is deflected by spurious magnetic fields or the gun 30' is not properly positioned. It is further generally desirable for obtaining a sound weld seam 24', that a predetermined distance in x direction is maintained between the beam impingement spot 18 and the point, at which the filler wire 20 enters the gap or pool of molten material.

The elevation of FIG. 9 shows schematically an arrangement for measuring any deviations of the beam and producing signals which are useful for effecting any necessary correction of the position of the beam. The reference numeral 10' denotes an electron beam aligned with a center axis 31' of a beam gun not shown and extending in z direction. This is the desired mean position of the beam. The beam impinges on a spot 18' on a surface 34' of a workpiece arrangement which may be formed of the plates 14' and 16' (FIG. 8). In this position, the beam performs the working operation, e.g. the welding of the gap 12' (FIG. 8).

The welding or other operation is periodically interrupted for a short period of time (measuring period) for measuring purposes. During the measuring period, the beam is deflected to trace a measuring path on the surface of the workpiece arrangement as will be explained in more detail below. The start and the end of the measuring path are the normal working position of the beam 10'. A radiation sensor 27', as an X-ray sensor has a field of view 25' which is defined by diaphragms or collimators as known in the art. The field of view 25' has a generally oblique orientation with respect to the surface 34' and the gun or machine axis 31' and defines a measuring region on the surface 34'. The measuring region is positioned in advance of the momentary working position corresponding to the spot 18' and preferably has two pairs of mutually parallel boundaries of which one pair 34'a and 34'b crosses the gap 12' or other track to be treated by the beam. The boundaries of the other pair are not visible in FIG. 9, they are positioned in front of and behind the plane of drawing of FIG. 9 and extend preferably essentially parallel to the x direction. The sensor 27' produces an output signal as long as the beam impingement spot 18'' is within the boundaries of the measuring field on the workpiece surface. FIG. 10 shows the situation on the workpiece surface which is shown in FIG. 9 in elevation. x is the direction of relative movement between the machine axis 31' and the workpiece arrangement; y is the direction transverse thereto and to the direction of the machine axis, and z is the direction of the machine axis, the sign being chosen to correspond to the direction of propagation of the beam. Usually, the beam 10' is oscillated in the y direction as indicated by a double arrow W so that it strikes the edges of the workpiece parts 14' and 16' forming the gap 12'. The field of view 25' has a mean direction 25'a (FIG. 9) which forms an angle α with the xy plane. The measuring region defined by the field of view of the sensor, not shown in FIG. 10, defines a rectangular measuring field having two pairs of parallel boundaries 34a', 34b' and 34c', 34d' which is positioned in the x direction in advance of the working site 18'.

During the measuring period, which is sufficiently short to avoid any impairing of the welding process, the beam is deflected to trace a measuring path 22', which starts from and ends at the working site 18'. Preferably, the beam current and accelerating voltage of the beam are the same during the working operation, e.g. welding and the measuring period. The measuring path 22' comprises in the embodiment shown in FIG. 10 an oblique portion 22a' starting from the working site 18' and having a component both in the x and negative y direction. The next portion 22b runs parallel to the x-direction and crosses the measuring field boundary 34a' at a point 40a' and the measuring field boundary 34b' at a point 40b'. Thus, the sensor will produce an output signal between the points 40a' and 40b'. The next portion 22c' of the measuring path extends in the y direction and crosses the gap. The path 22' then returns symmetrically to the point of origine 18' via a portion 22d' extending in the negative x direction and a portion 22e' *extending both in the x and negative y directions.*

The value of the output signal of the sensor 27' changes at the crossing points 40a' to 40b'. When the beam impingement spot is outside of the measuring field, the sensor receives only background radiation and, in case of an X-ray sensor, produces output pulses at a low rate. However, when the beam impingement spot enters the measuring field defined by the boundaries 34a' to 34d', the pulse rate and, thus, the output current J of the sensor increases more or less steeply as will be explained with reference to FIGS. 11a and 11b which show the time function of the output current of the sensor for a sharply and a less sharply focussed beam respectively. The time t is proportional to the distance travelled along the measuring path, the velocity of the beam impingement spot along the measuring path being assumed as constant. With a sharply focussed beam, the change of the output signal is relatively steeply, as shown in FIG. 11a. While the output current before and after the step show some fluctuations, they can be regarded as constant and having a value $J_{min}$ and $J_{max}$. The crossing of the boundary of the measuring field is defined by a threshold value $J_s$ of the output current at which a signal processing circuit receiving the output signal of the sensor response. The threshold value is also subject to an avoidable fluctuation so that the response will occur anywhere within an interval of time $\Delta \tau$, the size of which depending on the steepness of the rise of the output signal of the sensor as shown in FIGS. 11a and 11b.

It will now be explained with reference to FIG. 12, how the effects can be avoided which this uncertainty of the determination of the time of crossing the measuring field boundary has on the control and regulating signals. The point of time, at which the beam crosses a measuring field boundaries occurs anywhere within an uncertainty range $\Delta t$. Thus, at the entrance of the beam spot into the measuring region (e.g. at point 40a' in FIG. 10) the time of crossing occurs within the uncertainty region $\Delta t_E$ and at the exit of the beam spot at e.g. the point 40b, the point of time of boundary crossing is established within the uncertainty range $\Delta t_A$. Since essentially the same conditions prevail at both the entrance boundary and the exit boundary, a mean value $T_M$ of the established points of time of entrance and exit, respectively, will be less subject to the uncertainties and better suited as a basis for forming a regulating signal. Thus, the mean value $T_M$ constitutes a more exact definition of the position of the measuring field than either the point of entrance 40a' and the point of exit 40b'.

FIG. 13a is a schematic plane view of the workpiece surface showing a measuring path 22' of the same general type as disclosed with reference to FIG. 10, the boundaries 34a' to 34b' of the measuring field, the uncertainty ranges $\Delta t_E$ and $\Delta t_A$, and the mean value $P_M$ now in the space domain. Thus $T_M$ gives an exact indication of the position, in the x direction, of the measuring field defined by the parallel boundaries 34a' and 34b' with respect to a reference point, e.g. point 18', of the measuring path 22'.

FIG. 13b shows a situation, where the surfaces of the plates 14' and 16' are offset in the z direction (normal to the plane of drawings in FIG. 13b). Since the mean direction 25a' of the field of view of the sensor 27' forms an angle α (FIG. 9) with respect to the xy plane, to which the workpiece surfaces are parallel, the portions of the measuring field which are projected on the offset surfaces of the workpiece part 14' and 16' are offset to each other in the x-direction as shown in FIG. 13b. Thus, four different points of time corresponding to the boundary crossing points 40a', 40b', 40c' and 40d' are obtained during the measuring period since the crossing points 40a', 40d' and 40b', 40c' do not have mirror-image positions with respect to the gap 12'. A mean value of those four different crossing times will produce an acceptable compromise if used as a basis for the regulation. A regulating signal can be advantageously derived from the mean value between the mean value of the trace portion 22b' and the mean value of the retrace portion 22d', thus on a mean value of all of the four points of time corresponding to the boundary crossing points 40a' to 40b'. The time mean value thus derived is a measure of the position of the measuring region on the surfaces of the workpiece parts relative to a reference position, e.g. the starting point 18.

Thus, the position of the mean beam impingement spot 18' in the working position relative to a machine or gun axis can be determined by the combination of a measuring field having at least one boundary, as boundary 34a' and 34b', crossing the x direction (direction of relative movement between the machine axis and the workpiece) relative to the machine or gun axis in the x direction. An error can be produced if said position does not coincide with the beam axis and the deviation can be corrected or compensated as known in the art.

FIG. 13c shows a triangular measuring path which may be used for establish any deviation of the beam impingement spot from the gun or machine axis in y direction. The measuring path of FIG. 13c has the form of equilateral triangle having a base side 22c" which is essentially parallel to the y direction, and a pair of equal sides 22a" and 22e" which form a corner which is situated at the beam impingement point 18' and forms the start and end of the measuring path. The sensor output signal will rise, when the beam spot crosses the boundary 34c' and decrease again when the spot travelling along the base side 22c" crosses the boundary 34d'. The point of time of crossing a boundary, preferably the mean value of both points of time is a measure of the y position of the starting point 18" of the beam and, thus, an indication of any deviation between the starting point 18" and the gun axis. Thus, a signal can be derived which may be used as known in the art for compensating the deviation in the y direction, e.g. a pair of deflection coils positioned to effect a beam deflection in the y direction.

FIG. 14 is a block diagram of a preferred embodiment of a system for processing the output signals of the sensor signals produced as described above: A sensor 27' which may be constructed and positioned as the sensor 24 in FIG. 2 produces pulses, the rate of which being essentially proportional to the intensity of the radiation received from the field of view of the sensor. The output pulses are applied to a pulse forming and rate determination circuit 41', in which the shape of the pulses is normalized and the rate of the pulses is established. The rate values, which may be produced at predetermined intervals determined by a clock (not shown) are stored in an intermediate memory, as a random excess memory (RAM) 42'. RAM 42' is coupled to an input of a processing unit 43' which may comprise a microcomputer. The rate values may be transferred ON-LINE from RAM 42' to the processing unit 43' under the control of clock pulses produced by a clock generator 44'.

The processing unit 43' communicates with a beam deflection circuit 47' and establishes the boundary crossing times and, if desired, the mean values TM thereof on the basis of the beam deflection signals determining the progress of the beam along the measuring path, and the rate values accessed from the RAM 42'. The digital processing unit 43' produces a digital output signal which is applied to an interface 45' for transformation into a signal format suitable for effecting a correcting action, as a correcting deflection signal which is applied to means 46', as deflecting coils to correct the position of the beam impingement point relative to the machine axis and/or the position of the workpiece relative to the machine axis. While one interface 45' and on control means only are shown in FIG. 14, it is to be understood that a second set of these units will be present if the correction is to be effected both in the x and the y directions.

It had already been pointed out that it is generally desirable to operate the beam both during the working of the workpiece (e.g. welding) and the measuring period with the same acceleration voltage and beam current, i.e. with the same beam power, because reducing the beam power may change the electron-optical conditions and cause position errors. Further, some working operations, as hardening, require a defocussed beam which forms a correspondingly large impingement spot which is not well suited for measuring purposes. Summarizing, the conditions of the beam suitable for working the workpiece may not be ideal for measuring purposes.

This problem is solved or at least alleviated by a further aspect of the invention which is useful for any type of radiation used for measuring purposes (electromagnetic radiation, secondary electrons, back scattered electrons) and for any shape of measuring path.

A first solution to the above problem is to make the beam astigmatic during the essential portion of the measuring path. A second solution is to change the focus condition of the beam during the essential portion of the measuring type.

An electron beam welding machine is schematically shown in FIG. 15, which comprises a beam gun 130 connected to a high voltage terminal 132 and a heating current supply 134. The E.B. machine further comprises a conventional focussing lens 136 connected to a focus current supply 138, and a deflection system 140 comprising two pairs of opposed deflection coils connected to a deflection current supply 142. As far as described, the electron beam machine may be of conventional construction.

According to the above mentioned aspect of the invention, the electron beam machine of FIG. 15 further comprises an additional unit 144 which may comprise a stigmator and/or a low-inductivity auxiliary focussing lens. The unit 144 is preferably positioned adjacent the main focussing lens 136 between that lens and the surface 146 of a workpiece. The unit 144 is connected to be controlled by a control unit 148.

FIG. 16 shows a preferred embodiment of a stigmator system which may be used in the unit 144. Generally speaking, a stigmator is a device for producing a multipole field, as a sixpole field as shown. The field is preferably a magnetic field. The stigmator shown in FIG. 16 comprises an annular magnetic core 150 having six protruding pole pieces and three sets of winding 152a, 152b and 152c. The windings of each set are wound around a corresponding pair of opposed pole pieces in a sense so that magnetic poles of opposite polarity are formed at the ends of the pole pieces facing the electron beam 110. Each set of windings is connected to an individual control circuit. For the sake of simplicity, only the control circuit 148a connected to the set of windings 152a is shown. The control circuits for the other sets of windings are essentially identical. The control circuit 148a comprises a pair of complementary transistors 154, 156. The emitter-collector-path of the transistors are connected in series across a positive and negative terminal of a power source (not shown). The voltages at the positive and negative terminals are of essentially equal magnitude and opposite polarity. The junction of the emitter-collector-path is connected to one end of the set of windings 152a, the other end being grounded. The base electrodes of the transistors 154, 156 are coupled to the output of a digital-analog-transducer 158 having an input coupled to an output 159a of a processing unit 160 which may comprise a micro computer and may be formed a part of processing unit 43' in FIG. 14. The processing unit 160 is programmed such that currents of a selected magnitude flow in the set of windings 152 during the measuring period to produce a suitable multipole field which distorts the normally essentially circular cross section 110a of the beam in e.g. a star-like pointed shape 110b as shown in FIG. 17. The distorted impingement spot corresponding to the cross-section 110b has a narrow, spike-shaped portion 110c'. If the measuring field boundary 34b' (ssee FIG. 13c) is positioned so that the sensor sees only the spiked portion 110c' of the beam impingement spot, and the beam is deflected in the direction of the arrow in FIG. 17, a very sharp and well defined signal is produced, when the beam impingement spot crosses the gap 12'.

FIG. 18 shows another shape, into which the cross section of the beam can be distorted by the stigmator. This shape has a spiked portion 110c' directed in the deflection direction. In such case, a signal as shown in FIG. 19 is produced, when the beam impingement spot crosses the measuring field boundary 34c' (FIG. 13c). From this signal, a well-defined point of time $t_{xo}$ can be produced by means of threshold circuit.

The computer or processing unit 160 is programmed and controlled by a clock generator (as clock generator 44' in FIG. 14) to initiate a measuring period after a predetermined period of time or after a predetermined distance of the relative motion of the machine axis with respect to the workpiece. The measuring program is read from a suitably programmed memory, as a PROM. The processing unit 160 provides deflection signals to the deflection current source 142 so that the beam is deflected along the desired measuring path, as the path 22' in FIG. 13a or 13c. Further, the processing unit 160 issues digital signals to the stigmator unit 148 which are transformed in the digital-analog-transducers 158 in control signals for the transistors 154, 156. In response thereto, the control circuits 148 produce currents of such polarities and magnitudes in the sets of coils 152 that the desired astigmatic distortion of the beam is effected.

The auxiliary focussing coil may be an ironless focussing coil 144a as schematically shown in FIG. 15. The maximum refracting power of the auxiliary focussing coil 144a may be about 20 percent of said of the main focussing coil 136. The auxiliary focussing coil 144a may be connected to a control circuit similar to the control circuit 148a shown in FIG. 16.

The auxiliary focussing coil 144a allows a quick adjustment of the focussing condition of the beam so that the focussing condition of the beam may be quickly changed between a defocussed state during the working operation and a well focussed state during the measuring period. The control of the excitation current of the auxiliary focussing coil 144a is similar to that described above with reference to the control of the current in each of the coil sets of the stigmator unit.

The described astigmatic deformation and/or change of focussing state by means of a "quick" ironless auxiliary focussing coil is generally useful for charge carrier beam machine tools independently of the beam position control employed.

We claim:

1. In a charged particle beam process, wherein a charged particle beam generator generates a beam of charged particles directed at a workpiece along an axis and said beam impinges upon a surface of said workpiece at a working beam impingement point, wherein said beam generator is moved relative to said workpiece in a first direction, thereby to move said working beam impingement point along a working path on said workpiece, a method for measuring the deviation of said working beam impingement point from an ideal beam impingement point comprising the steps of:

positioning an X-ray radiation sensor having an angular region of sensitivity defined by a boundary, said sensor being positioned at a fixed location relative to said beam generator such that said boundary comprises a boundary line on said workpiece spaced from said ideal beam impingement point;

periodically deflecting said beam of charged particles to move said working beam impingement point during a deflection time interval, with predetermined deflection speed, along a predetermined closed measuring path on said workpiece surface, said measuring path crossing said boundary line on said workpiece surface;

detecting the output of said sensor during said deflection time interval and comparing said detected output to a threshold value, said threshold value being selected to have a value between the value of said output signal when said working beam impingement point is in said angular region of sensitivity and the value of said output signal when said working beam impingement point is outside said region, thereby to measure the time during said interval at which the working beam impingement point of said beam crosses said boundary line;

and analyzing said time measurement with respect to said deflection speed and path, thereby to determine the deviation of said working beam impingement point from said ideal beam impingement point.

2. The method as claimed in claim 1 wherein said sensor is arranged and positioned such that at least a portion of said boundary line is parallel to said first direction.

3. The method as claimed in claim 1 wherein said sensor is arranged and positioned such that at least a portion of said boundary line is parallel to a second direction (y) which is normal to said first direction and said axis.

4. The method as claimed in claim 1 or 3 wherein said sensor is arranged and positioned such that said boundary comprises at least one pair of mutually parallel straight boundary lines.

5. The method as claimed in claim 1 wherein said measuring path has two portions which are parallel to said first direction and a connecting portion which is essentially perpendicular to said first direction.

6. The method as claimed in claim 1 wherein said sensor is arranged and positioned such that said boundary comprises at least one pair of mutually parallel straight boundary lines crossed by at least one portion of said measuring path, and that said deviation is a function of the mean value of the times at which said beam crosses said pair of mutually parallel boundary lines.

7. The method as claimed in claim 1 wherein the cross section of said beam is altered during said deflection time interval said altering including at least one of the measures:
    (a) changing the focus condition of the beam and
    (b) changing the astigmatism of the beam.

8. The method as claimed in claim 1 wherein said beam is oscillated in a second direction perpendicular to said first direction by a deflection signal, and said ideal beam impingement point is the ideal position of said beam when said deflection signal is zero.

9. In a charged particle beam processing apparatus having a charged particle beam generator for emitting a beam of charged particles along a beam axis onto a surface of a workpiece, wherein said workpiece is moved in a first direction relative to said beam axis whereby the working point of impingement of said beam moves across said surface, apparatus for maintaining the location of the working point of impingement of said beam at a desired location on said surface relative to other parts of said processing apparatus, comprising:
    a sensor for X-ray radiation located in a fixed position relative to said generator and having an angular region of sensitivity defined by boundary surfaces which intersect said workpiece surface to form a boundary line spaced from said working point of impingement;
    timing means for generating periodic measurement deflection timing signals;
    deflection means, responsive to said deflection timing signals, for deflecting said charged particle beam to move the actual impingement point during a deflection time interval with predetermined deflection speed, along a predetermined closed measuring path on said workpiece surface, said measuring path crossing said boundary line on said workpiece surface, and responsive to supplied deflection correction signals for adjusting the location of said working point of impingement on said surfaces;
    threshold means, responsive to the output of said sensor during said deflection time interval, for comparing said output to a threshold value, said threshold value being selected to have a value between the value of said output signal when said actual impingement point is in said angular region of sensitivity and the value of said output signal when said actual impingement point is outside said region, thereby to generate a threshold timing signal representative of the time during said interval at which the actual impingement point of said beam crosses said boundary line;
    and signal processing means, responsive to said deflection timing signals and said threshold timing signals for generating said deflection correction signals.

10. Apparatus as claimed in claim 9 wherein said sensor has a boundary surface comprising a first plane which is parallel to and spaced from said axis.

11. Apparatus as claimed in claim 10 wherein said first plane is normal to said first direction, and wherein there is provided a second X-ray sensor having an angular region of sensitivity defined by a second boundary plane, inclined with respect to the said axis and oriented to intersect said first plane in a line of intersection, which is parallel to a second direction (y) which is normal both to said axis and said first direction, said line of intersection lying in a plane which coincides with a desired position of said workpiece surface, and said threshold means generates first and second timing signals representing the time at which said actual impingement point on the workpiece surface crosses boundary lines formed by said first and second planes, respectively.

12. Apparatus as claimed in claim 11 further comprising means for regulating the distance (X) between a first point where said beam axis crosses a third plane normal to said axis and tangent to said workpiece surface, and a second point where an axis of a filler wire supplied to said workpiece surface transverses said third plane, said regulating means including means for producing a deflection correction signal representing any deviation $\Delta x$ from said distance, said deviation being defined by the equation $$\Delta x = (S_B - S_O) + (S_B - S_R) \tan \alpha \tan \phi$$

wherein
    $S_O$ is the desired distance;
    $\alpha$ is the angle between said third plane and said second boundary (28a);
    $\phi$ is the angle between the filler wire axis and said plane;
    $S_B$ is a first signal derived from an output of said first sensor;
    $S_R$ is a second signal derived from an output of said second sensor.

13. In a charged particle beam apparatus having a charged particle beam generator for emitting a beam of charged particles along a beam axis onto a surface of a workpiece, wherein said workpiece is moved in a first direction relative to said beam axis whereby a working point of impingement of said beam moves across said surface, apparatus for determining the location of the working point of impingement of said beam on said surface relative to said generator comprising:
    a sensor for X-ray radiation, located in a fixed position relative to said generator and having an angular region of sensitivity defined by boundary surfaces which intersects said workpiece surface to form a boundary line spaced from said working point of impingement;
    timing means for generating periodic measurement deflection timing signals;
    deflection means, responsive to said deflection timing signals, for deflecting said charged particle beam to move the actual impingement point during a deflection time interval, with predetermined deflection speed, along a predetermined closed measuring path on said workpiece surface, said measuring path crossing said boundary line on said workpiece surface;
    threshold means, responsive to the output of said sensor during said deflection time interval, for comparing said output to a threshold value, said threshold value being selected to have a value between the value of said output signal when said actual impingement point is in said angular region of sensitivity and the value of said output signal when said actual impingement point is outside said region, thereby to generate a threshold timing signal representative of the time during said interval at which the actual impingement point of said beam crosses said boundary line;
    and signal processing means, responsive to said deflection timing signals and said threshold timing signals for generating signals representative of the location of said working impingement point of beam impingement relative to said generator.

* * * * *